UNITED STATES PATENT OFFICE.

RICHARD BLAIR EARLE, OF CAMBRIDGE, MASSACHUSETTS, ASSIGNOR TO HOOD RUBBER COMPANY, A CORPORATION OF MASSACHUSETTS.

PROCESS OF PREPARING ELASTIC SUBSTANCES.

1,094,317. Specification of Letters Patent. Patented Apr. 21, 1914.

No Drawing. Application filed February 5, 1913. Serial No. 746,400.

*To all whom it may concern:*

Be it known that I, RICHARD BLAIR EARLE, citizen of the United States, residing at Cambridge, Massachusetts, have invented certain new and useful Improvements in the Process for Preparing Elastic Substances, of which the following is a specification.

The object of the present invention is the production of elastic substances or artificial rubber in a commercial way, and the invention consists in the process hereinafter described and particularly set forth in the appended claims.

According to my present invention, I prepare elastic substances or artificial rubber by the action of one of the higher fatty acids upon an erythrene hydrocarbon, such, for instance, as one of the hydrocarbons of the homologous series of which butadiene-1.3 is the lowest member.

In order to illustrate the new process more fully, the following examples are given:

1. Isoprene, $\beta$-methylbutadiene-1.3, is heated in a closed vessel after 2% of its weight of stearic acid has been added, to a temperature of 100°–105° C. for 200 hours. At the end of this time the contents are nearly solid if pure material has been used. The mass is cut up and treated with live steam which carries away unchanged hydrocarbon and side products formed. The mass is then dried and is ready for use.

2. $\beta\gamma$-dimethyl-butadiene,

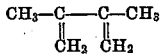

is heated in a closed vessel, after 2% of its weight of stearic acid has been added, to a temperature of 100°–110° C. for 300 hours. At the end of this time the contents are practically solid if pure material has been used. The mass is treated with live steam which carries away unchanged hydrocarbon and side products formed. The mass is then dried and used as a substitute for rubber.

3. Butadiene-1.3 ($CH_2=CH-CH=CH_2$) is heated in a closed vessel, after 2% of its weight of stearic acid has been added, to a temperature of 110° to 115° C. for two weeks. At the end of this time the contents of the vessel are solid and may be freed from unchanged hydrocarbon and side products by a current of live steam.

I claim as my invention:—

1. The herein described process which consists in adding one of the higher fatty acids to an erythrene hydrocarbon and subjecting the same to heat and pressure until the mass is substantially solid.

2. The herein described process which consists in adding to an erythrene hydrocarbon a small percentage of one of the higher fatty acids and heating the same in a closed vessel until the mass is substantially solid.

3. The process for preparing elastic substances by heating any of the hydrocarbons of the homologous series of which butadiene-1.3 is the lowest member with one of the higher fatty acids in a closed vessel until the mass is substantially solid.

4. The process for preparing elastic substances by heating any of the hydrocarbons of the homologous series of which butadiene-1.3 is the lowest member with one of the higher fatty acids in the proportion of from 1 to 3% of the acid, in a closed vessel to temperatures from 100° to 120° C. for the period of one to three weeks.

5. The herein described process which consists in adding to an erythrene hydrocarbon a small percentage of one of the higher fatty acids, and heating the same in a closed vessel until the contents are solidified, and freeing the solidified product from unchanged hydrocarbon and side products by a current of live steam.

6. The process for preparing elastic substances or artificial rubber by heating any of the hydrocarbons of the homologous series of which butadiene-1.3 is the lowest member, with stearic acid, in the proportion of from 1 to 3% of the acid, in a closed vessel, under pressure, to temperatures from 100° to 120° C. for the period of one to three weeks.

7. The improved process of preparing elastic substances which comprises heating a mixture of isoprene with one of the higher fatty acids until the product is substantially solid.

8. The herein described method of preparing artificial rubber which consists in adding one of the higher fatty acids to isoprene and subjecting the mixture to heat and pressure until the product is substantially solid.

In testimony whereof, I affix my signature in presence of two witnesses.

RICHARD BLAIR EARLE.

Witnesses:
M. A. HAGARTY,
E. GRACE BROWNE.